US008648274B2

(12) United States Patent
Carlson et al.

(10) Patent No.: US 8,648,274 B2
(45) Date of Patent: Feb. 11, 2014

(54) ARC RESISTANT ELECTRICAL ENCLOSURE

(75) Inventors: Kurt Nels Carlson, Bluff City, TN (US); Gregory Allen Sanders, Glade Spring, VA (US)

(73) Assignee: SMC Electrical Products, Inc., Huntington, WV (US)

( * ) Notice: Subject to any disclaimer, the term of this patent is extended or adjusted under 35 U.S.C. 154(b) by 353 days.

(21) Appl. No.: 13/110,348

(22) Filed: May 18, 2011

(65) Prior Publication Data

US 2011/0286165 A1    Nov. 24, 2011

Related U.S. Application Data

(60) Provisional application No. 61/345,807, filed on May 18, 2010.

(51) Int. Cl.
*H01H 33/08* (2006.01)
*H02B 1/04* (2006.01)

(52) U.S. Cl.
USPC ............. 218/157; 218/158; 218/34; 361/608; 361/634

(58) Field of Classification Search
USPC ................... 218/34, 155–158; 361/600–678
See application file for complete search history.

(56) References Cited

U.S. PATENT DOCUMENTS

| | | | |
|---|---|---|---|
| 1,137,172 A | 4/1915 | Stewart | |
| 1,440,377 A | 1/1923 | Crumley | |
| 3,394,843 A | 7/1968 | Grady | |
| 3,803,376 A * | 4/1974 | Gryctko | 218/149 |
| 5,457,296 A | 10/1995 | Neill | |
| 5,710,402 A * | 1/1998 | Karnbach et al. | 218/157 |
| 5,767,440 A * | 6/1998 | Byron et al. | 174/17 VA |
| 6,410,844 B1 * | 6/2002 | Bruner et al. | 174/17 VA |
| 6,642,832 B2 | 11/2003 | Pellon | |
| 6,960,736 B1 * | 11/2005 | Bach et al. | 218/155 |
| 7,821,774 B2 * | 10/2010 | Josten et al. | 361/605 |
| 7,952,857 B1 * | 5/2011 | Motley et al. | 361/678 |
| 8,519,287 B2 * | 8/2013 | Raabe et al. | 200/306 |
| 2004/0097186 A1 * | 5/2004 | Eiselt et al. | 454/184 |
| 2008/0067153 A1 | 3/2008 | Pollitt | |
| 2010/0085671 A1 | 4/2010 | Allalouf | |

FOREIGN PATENT DOCUMENTS

WO    2010047648    4/2010
WO    PCT/US11/036976    5/2011

* cited by examiner

*Primary Examiner* — Zachary M Pape
(74) *Attorney, Agent, or Firm* — Brian S. Steinberger; Phyllis K. Wood; Law Offices of Brian S. Steinberger, P.A.

(57) ABSTRACT

Methods, systems, apparatus and devices for an arc resistant electrical enclosure that includes a duct system of adjacent pressure relief chambers separated by flame arresting ventilation partitions to provide a torturous mechanical maze to relieve internal pressure and extinguish internal hot flames within the flame arresting duct system prior to exiting the enclosure expelling gasses into the external environment. The adjacent partitioned pressure relief chambers for routing pressure and or flames through the duct system with ninety degree turns from one pressure relief chamber into the next adjacent pressure relief chamber. In an embodiment, a set of ventilation panels is located within one or more of the adjacent pressure relief chambers and each next pressure relief chamber can have a volume that is less than the volume in the preceding chamber.

19 Claims, 7 Drawing Sheets

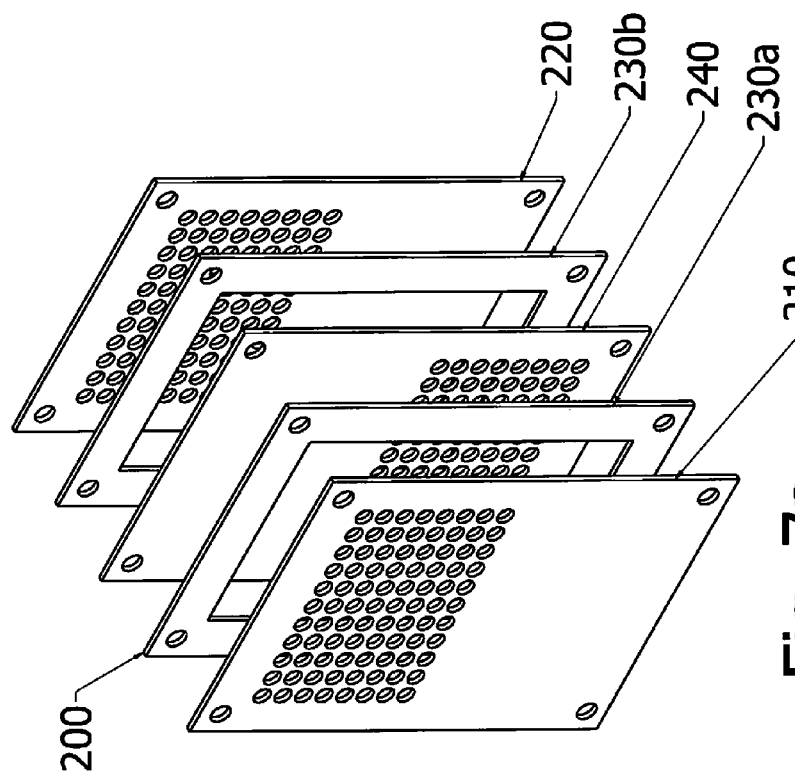

ARC RESISTANT ELECTRICAL ENCLOSURE

This application claims the benefit of priority to U.S. Provisional Application No. 61/345,807 filed on May 18, 2010.

FIELD OF THE INVENTION

This invention relates to electrical enclosures and, in particular, to methods, systems, apparatus and devices for an arc resistant electrical enclosure having a duct system with pressure relief chambers and flame arresting ventilation partitions.

BACKGROUND AND PRIOR ART

An underground mining operation such as a coal mine presents hazardous conditions for both machines and workers. An underground coal mine resembles a large construction project and frequently groups of workers are around or near high power electrical equipment. Mining equipment quite often requires large amounts of electrical power located near the underground excavation point which creates a need for large power transformers near the excavation point. These electrical power transformers combined with input, output, and control circuitry are combined in one enclosure called a power center. A power center is typically protected by a solid sheet-metal enclosure. The enclosure's main purpose is to protect the electrical components from dust, dripping water, and condensation, and dissipate heat. In addition, the enclosure must protect the electrical components from damage due to rock slides, rock falls, and cave-ins.

In addition to protecting the internal electrical components, enclosures are designed to increase mine safety. In the event of an internal electrical failure within the power center, the enclosure must retard the introduction of flames or sparks into the mining area where flammable materials may be ignited.

Currently, arc resistant enclosures in the industrial markets are designed to withstand the pressures and temperatures of gasses associated with an internal arcing fault and are configured to safely direct these gasses out of the roof of the enclosure away from personnel. This type of configuration is problematic for the underground mining industry where the ceiling of the mine is often only a few inches away from the top of the electrical enclosure. To make things worse, the ceiling and walls of the mine often contain flammable material such as coal. The surrounding air is also often times contaminated with coal dust and possibly explosive gases.

SUMMARY OF THE INVENTION

A primary objective of the invention is to provide methods, systems, apparatus and devices for an arc resistant electrical enclosure to prevent flames from an arc to escape the enclosure into the surrounding environment.

A secondary objective of the invention is to provide methods, systems, apparatus and devices for an arc resistant electrical enclosure having a duct system with pressure relief chambers and flame arresting ventilation partitions.

A third objective of the invention is to provide methods, systems, apparatus and devices for an arc resistant electrical enclosure having a duct system that provides a torturous mechanical maze with pressure relief and flame arresting ventilation partitions to release pressure of expelled gasses and extinguish flames prior to the gasses exiting the electrical enclosure.

A fourth objective of the invention is to provide methods, systems, apparatus and devices for an arc resistant electrical enclosure with segregated circuit breaker panel compartments to isolate an arc or fire in one circuit breaker panel compartment from the other circuit breaker panel compartments.

A fifth objective of the invention is to provide methods, systems, apparatus and devices for an arc resistant electrical enclosure with a duct system with two or more flame arresting compartments and flame arresting ventilation partitions between each flame arresting compartment and ventilation panels within the compartment to force a change in direction of an arc or flames while consuming oxygen to extinguish the flame.

A sixth objective of the invention is to provide methods, systems, apparatus and devices for an arc resistant electrical enclosure with segregated circuit breaker panel compartments, a duct system with pressure relief chambers and flame arresting ventilation partitions and an enclosed pressure relief area between the segregated circuit breaker panel compartments and the duct system.

A first embodiment provides an arc resistant electrical enclosure that can include partitioned electrical sections such as an electrical control area, a transformer area and a high voltage area and one or more flame arresting duct systems located within one partitioned electrical sections. Each flame arresting duct system including an access leading to two or more adjacent partitioned pressure relief chambers and an access in each of the pressure relief chamber partitions leading into a next one of the two or more adjacent partitioned pressure relief chambers, each next access located in an opposite one of the upper and the lower portion of the pressure relief chamber partition forming a torturous mechanical maze to extinguish internal hot flames within the flame arresting duct system prior to expelling gasses into the external environment.

The flame arresting duct system can include an arc chute having an opening into one of the partitioned electrical sections for conveying an internal pressure or flame in the partitioned electrical section into the flame arresting duct system and a flame arresting vent in a last one of the partitioned pressure relief chambers leading to the external environment. The arc chute can also include an inclined channel for conveying the internal pressure or flames to a different level, the arc chute terminating at an opening into a next adjacent partitioned pressure relief chamber.

The escape exit can be a flap that opens from a fault pressure in the pressure relief chamber and the access in each of the pressure relief chamber partitions can include a flap that opens from a fault pressure in the pressure relief chamber to direct the internal pressure or flames toward a next access flap leading to the next adjacent pressure relief chamber.

In a preferred embodiment, the flame arresting duct system can include an arc chute for conveying an internal pressure or flame from one of the partitioned electrical section into the flame arresting duct system, the arc chute terminating at a first partition having an opening in a lower portion of the first partition, an intermediate pressure relief chamber adjacent to the arc chute for directing the internal pressure or flame from the arc chute to a second partition having an second opening in upper portion of the second partition, a next pressure relief chamber adjacent to the intermediate pressure relief chamber to direct the internal pressure or flame from the intermediate pressure relief chamber to a next partition having opening in an opposite one of the upper and lower portion of the next partition, wherein the pressure and or flames are routed through the duct system with ninety degree turns from one pressure relief chamber into the next adjacent pressure relief chamber and a flame arresting vent in a last one of the partitioned pressure relief chambers to release an internal pressure into the environment.

The access in each of the pressure relief chamber partitions can be a flap that is opened by fault pressure, a vent or an unrestricted opening and the adjacent partitioned pressure relief chambers can have a volume of each next adjacent pressure relief chamber less than a previous adjacent partitioned pressure relief chamber volume. Optionally, one or more arc flash detectors can be included in a partitioned electrical section to actuate a flaps leading into the flame arresting duct system.

A second embodiment provides a method for relieving internal pressure and extinguishing a flame within an electrical enclosure that can include the step of providing a flame arresting duct system including a series of adjacent pressure relief chambers within an electrical enclosure to relieve internal pressure and extinguish the flame, the flame arresting duct system having two or more adjacent partitioned pressure relief chambers, drawing the internal pressure or internal flame into an arc chute of the flame arresting duct system, routing the internal pressure or internal flame through a series of adjacent pressure relief chamber with approximately ninety degree turns between adjacent pressure relief chambers forming a torturous mechanical maze to extinguish internal hot flames within the flame arresting duct system, and expelling the gasses from a last adjacent pressure relief chamber out of the electrical enclosure into the external environment.

Yet another embodiment provides a flame arresting duct system for an electrical enclosure to relieve internal pressure and extinguish flames within the electrical enclosure. The system can include an arc chute for conveying an internal pressure or flame from one of the partitioned electrical section into the flame arresting duct system, the arc chute terminating at a first partition having an opening in a lower portion of the first partition, an intermediate pressure relief chamber adjacent to the arc chute for directing the internal pressure or flame from the arc chute to a second partition having an second opening in upper portion of the second partition, a next pressure relief chamber adjacent to the intermediate pressure relief chamber to direct the internal pressure or flame from the intermediate pressure relief chamber to a next partition having opening in an opposite one of the upper and lower portion of the next partition, wherein the pressure and or flames are routed through the duct system with ninety degree turns from one pressure relief chamber into the next adjacent pressure relief chamber, and a flame arresting vent in a last one of the partitioned pressure relief chambers to release an internal pressure into an external environment.

Further objects and advantages of this invention will be apparent from the following detailed description of preferred embodiments which are illustrated schematically in the accompanying drawings.

BRIEF DESCRIPTION OF THE FIGURES

FIG. 7a is an assembly isometric view of a set of ventilation panels.

FIG. 7b is a side view of the set of ventilation panels shown in FIG. 7a.

DESCRIPTION OF THE PREFERRED EMBODIMENTS

Figure 1:
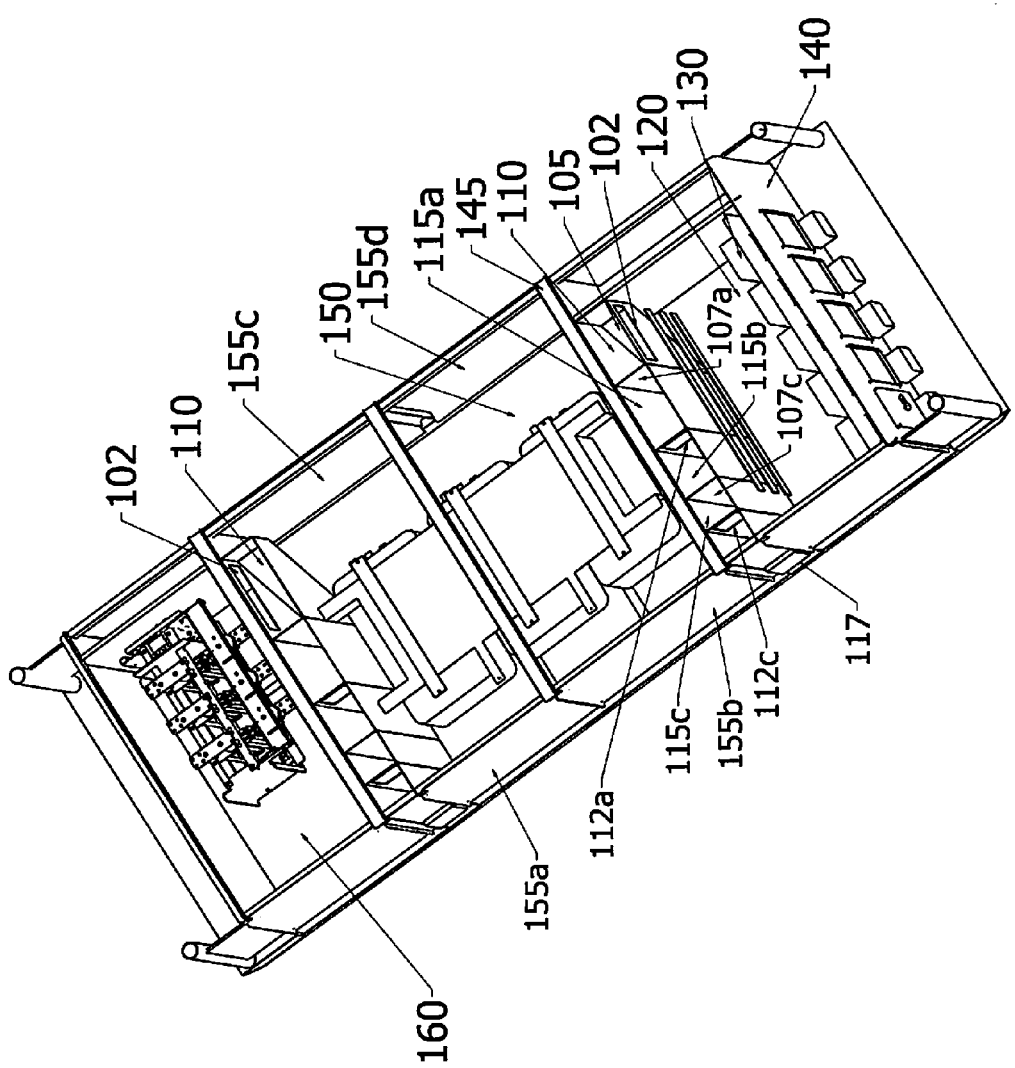
FIG. 1 is a top perspective view of an example of an arc resistant electrical enclosure showing the internal chambers.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the description and the drawings to identify components:
100 electrical enclosure
102 arc chute access
105 an arc chute
107 flame arresting partition
109 flap
110 duct system
112 partition opening
115 pressure relief chamber
117 flame arresting vent
118 exit flap
120 electrical control area
122 segregated CB area
124 CB area vent
125 flap
130 circuit breaker panels
140 control panel
150 transformer section
160 high voltage chamber
170 detector
200 set of vent panels
210 entrance vent panel
220 exit vent panel
230 passage layer
240 inverted vent layer Electrical power distribution systems used in a closed environment such as in underground mining should not allow flames from an internal arc to be directed outside the electrical enclosure. When the environment is underground mining where the ceilings and walls often contain flammable material such as coal, or the air surrounding the electrical enclosure is contaminated with coal dust and possibly explosive gasses, containment of the hot flames is required.

The present invention provides methods, systems, apparatus and devices to extinguish internal hot flames within the electrical enclosure prior to expelling gasses into the external environment. FIG. 1 is a top perspective view of an example of an arc resistant electrical enclosure 100 showing the internal chambers. As shown, the arc resistant electrical enclosure 100 includes one or more duct systems 110 that provides a torturous mechanical maze with pressure relief and flame arresting ventilation partitions to release pressure of expelled gasses and extinguish flames prior to the gasses exiting the electrical enclosure.

In this example, the arc resistant electrical enclosure 100 includes three separate component areas. The first area is the electrical control area 120 housing the circuit breaker panels 130 and the control panel 140. The second area shown is the transformer section 150, shown in FIG. 1 with a single three phase transformer, although the transformer area can house a variety of different configurations of transformers to meet different needs. The third area is the high voltage chamber 160. Although the electrical power distribution system shown enclosed in the arc resistant electrical enclosure includes a transformer section, in an alternative configuration the arc resistant electrical enclosure does not house a transformer section. It is possible for an arc to cause a fire in any one of the three areas, although the most common may be the high voltage area 160 and the electrical control area 120.

In an embodiment, the electrical control area of the arc resistant electrical enclosure 100 includes a front panel 140 that provides access to the control panel and a rear panel 145 that includes one or more flame arresting duct systems 110. The electrical control area 120 houses the main electrical bus connected with the control panel, circuit breakers 130 and other electrical components that can produce a spark which, depending on the gasses within the electrical enclosure, can produce a flame.

Figure 2:
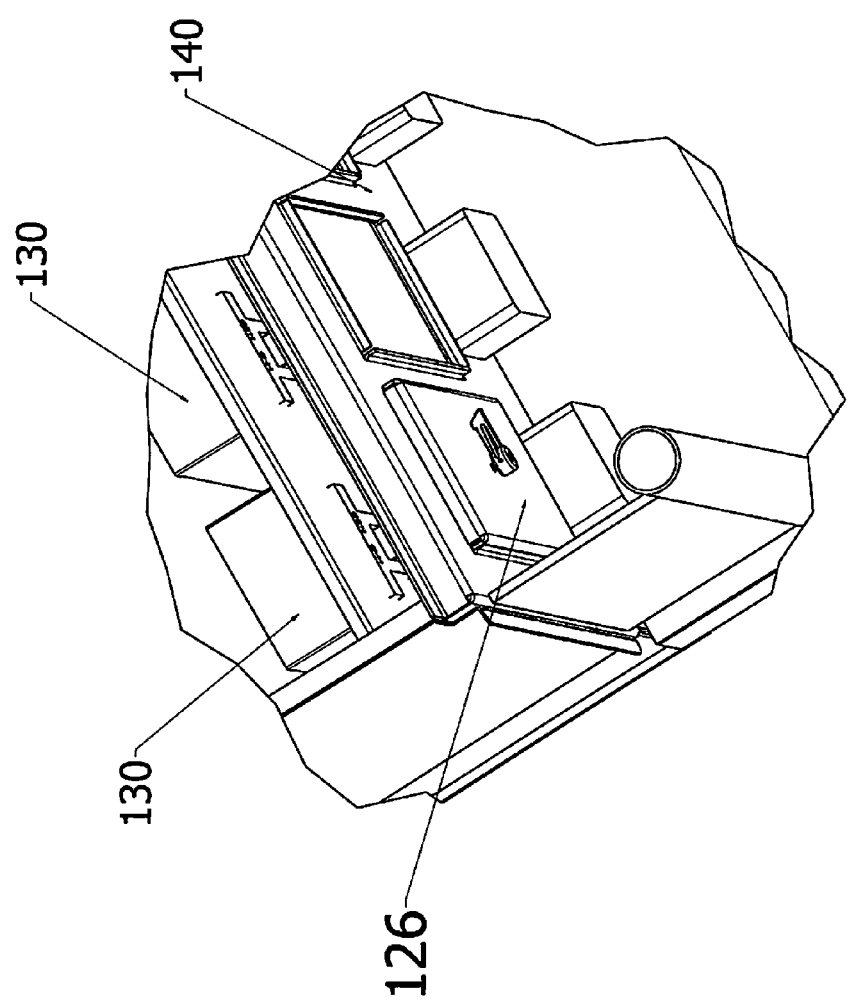
FIG. 2 shows a circuit breaker panel that is located behind covers with permissible type actuators.
Figure 3:
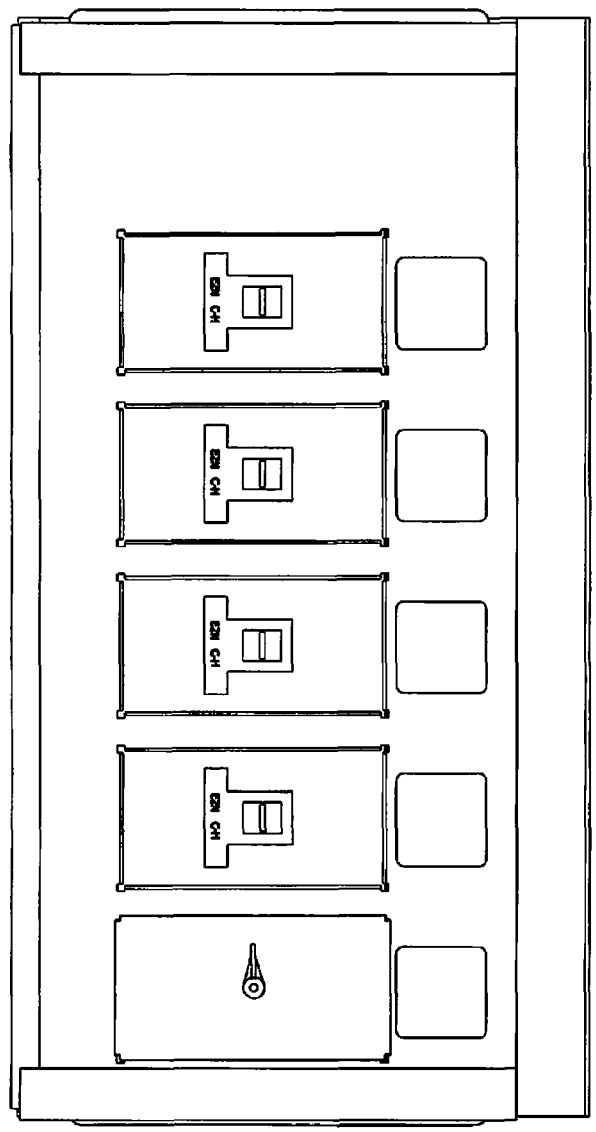
FIG. 3 is a view of the end panel providing access to the circuit breaker panels from the exterior of the arc resistant electrical enclosure shown in FIG. 1.

FIG. 2 shows a circuit breaker panel located behind covers shown with permissible type actuators and FIG. 3 is a view of the end panel providing access to the circuit breaker panels from the exterior of the arc resistant electrical enclosure shown in FIG. 1.

Figure 4:
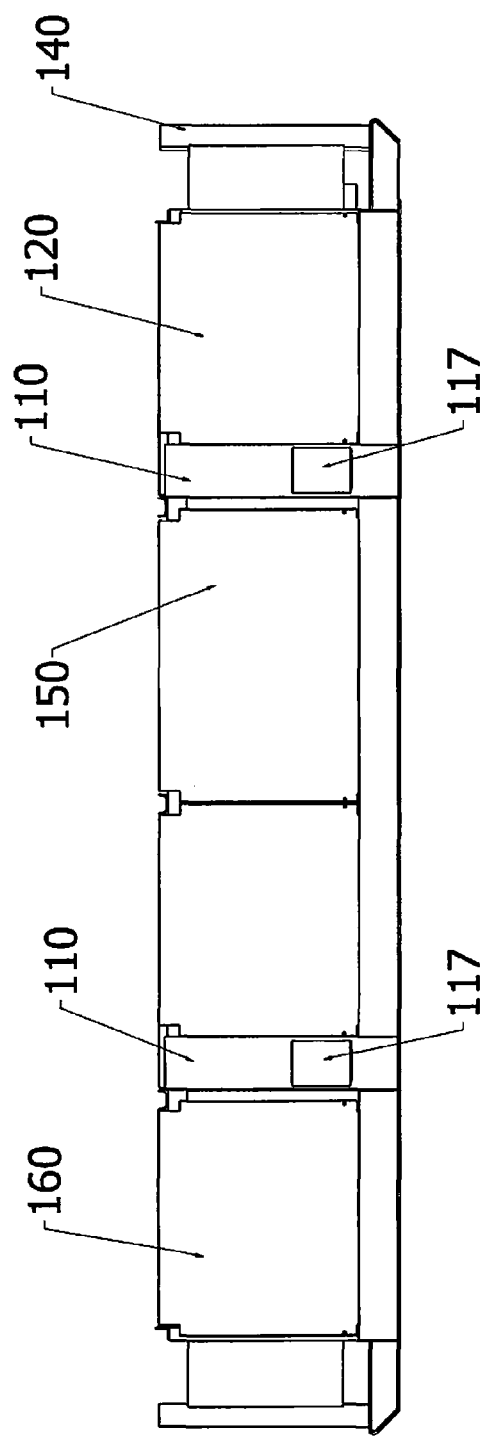
FIG. 4 is a side view of the arc resistant electrical enclosure showing an example of a flame arresting vent located in the side panel.
Figure 5:
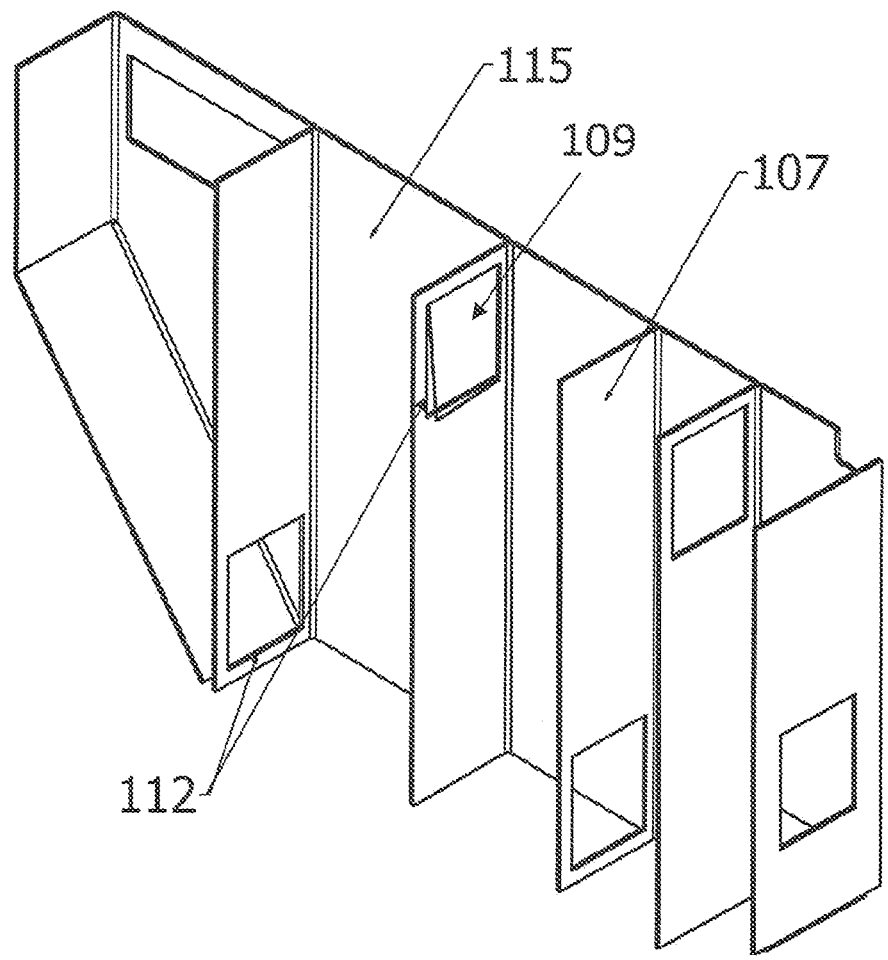
FIG. 5 is a perspective view of a flame arresting duct system according to an embodiment of the present invention.

Between the electrical control area 120 and the transformer area 150 is a duct system 110 to provide a torturous mechanical maze to relieve pressure and or extinguish internal hot flames within the electrical enclosure prior to expelling gasses into the external environment. The duct system 110 includes a series of adjacent partitioned pressure relief chambers 115a, 115b and 115c and an arc chute 105 that is shown as an inclined channel for conveying the internal pressure and/or flames to a lower level as shown in FIG. 5. The arc chute 105 terminates at an opening into an adjacent partitioned pressure relief chamber which directs the internal pressure and or flames upward to an opening 112 leading into the next adjacent partitioned chamber 115. Although an escape opening is shown as an open exit, each opening in the partition can include a flap 109 that opens from the fault pressure in the pressure relief chamber 115 to direct the internal pressure or flames toward a next flap leading into the next adjacent pressure relief chamber 115. FIG. 4 shows is a side view of the electrical enclosure shown in FIG. 1 showing an example of a flame arresting vent located in the side panel.

The example shown in FIG. 1 includes three adjacent partitioned pressure relief chambers 115a, 115b and 115c with the volume of each next chamber having a volume that is reduced by approximately one-third. The arc chute 105 shown in FIG. 1 includes a flap 102 that is opened by fault pressure. The pressure and or flames in the arc chute 105 are then routed to the lower opening in the pressure relief chamber partition 107 between the arc chute 105 and the first pressure relief chamber 115a releasing a portion of the built up pressure.

Within the first pressure relief chamber 115a the pressure and or flames are directed to an upper opening in the next partition between the first and second pressure relief chambers 115a and 115b, respectively. Each next partition of the adjacent pressure relief chambers has an opening in an opposite one of the upper and lower sections of the partition 107. With this configuration of partitions 107 between adjacent pressure relief chambers 115, the built up pressure and or flames are routed through the duct system 110 with ninety degree turns from one pressure relief chamber 115 into the next adjacent pressure relief chamber 115. The last pressure relief chamber includes a flame arresting vent 117 shown in FIG. 3 that releases the internal pressure into the environment.

As shown in FIG. 1, the high voltage chamber 160 can also include a duct system 110 with a flap 102 that is opened by fault pressure. While the duct systems 110 are both shown with an arc chute 105 and three adjacent partitioned pressure relief chambers 115a, 115b and 115c, an alternative number of partitioned pressure relief chambers can be substituted and the pathway from the arc chute into the first partitioned pressure relief chamber and between the adjacent pressure relief chambers can include vents, flaps or can be unrestricted openings. Likewise, the reduction in the volume of each next adjacent pressure relief chamber can be greater than or less than the one-third reduction shown and described in the preferred embodiment.

The electrical control area 120 shown in FIG. 1 includes all the circuit breaker access panels contained within one area with a single arc chute leading into the flame arresting duct system. An alternative configuration can include individual arc chutes for each circuit breaker access panel.

Figure 6:
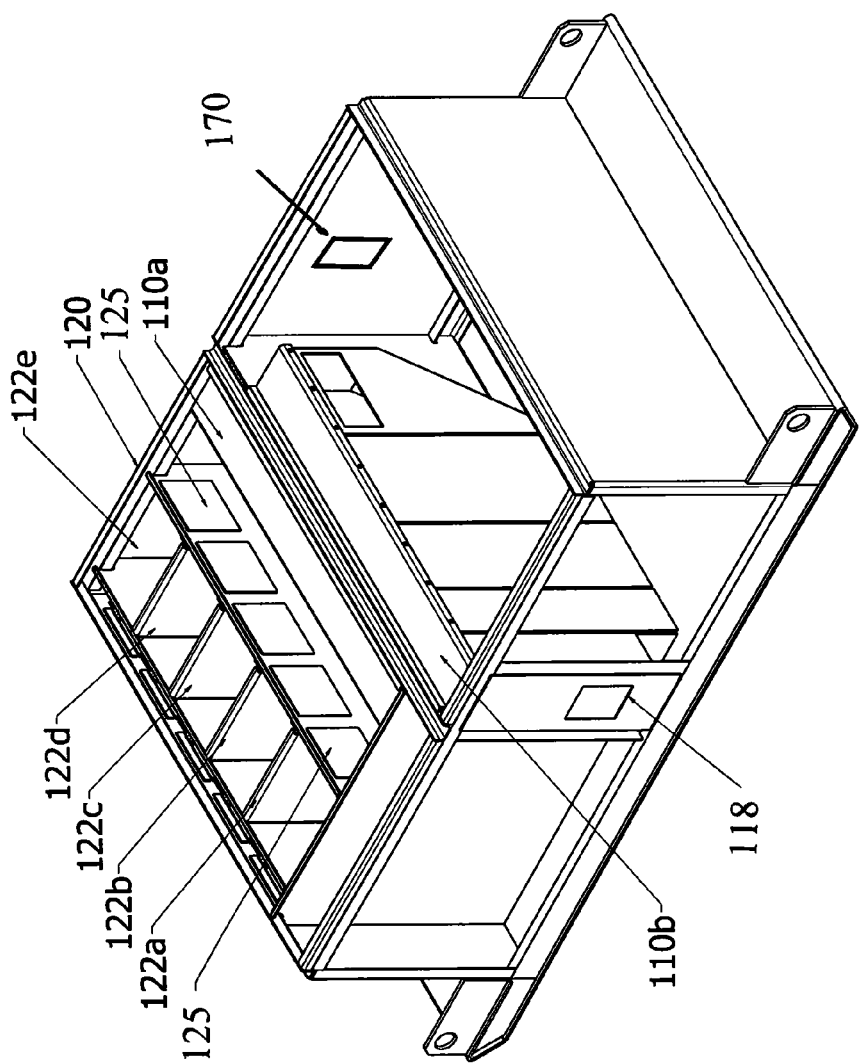
FIG. 6 is a perspective view of the segregated circuit breaker panel compartments within the electrical enclosure according to another embodiment of the present invention.

In yet another embodiment, the circuit breaker access panels have a common arc chute with each circuit breaker panel 122a-122e segregated from the adjacent circuit breaker access panels as shown in FIG. 6 to shield the other circuit breaker access panels by using a separate flap 125 into the common area leading to the arc chute opening into the flame arresting duct system 110. Any pressure escaping from the circuit breaker access panel shown in FIG. 2 is directed away from operating personnel by a flanged cover 126 conveying the internal pressure into the flame arresting duct system.

One skilled in the art should realize that the particularities in the duct system for the arc resistant enclosure should not be construed as limitations of the preferred embodiment. Various system configurations and corresponding components can be chosen and optimized for a particular application to achieve a desired performance to insure that the pressure of the expelled gasses is greatly reduced and that the flame is extinguished prior to exiting the electrical enclosure.

In the configuration shown in FIG. 1, the transformer section is vented with back to back type vents 155. In this example, the arc chute and adjacent pressure relief chambers is not included due to the transformer ventilation requirements and because load switching does not occur in the transformer section. In another embodiment of the present invention, the transformer section includes a heat exchanger to exchange heat inside the transformer chamber with the cooler outside environment. Using the heat exchanger moves heat out of the transformer section without releasing gasses into the exterior environment.

In an alternative embodiment, the arc resistant electrical enclosure includes one or more arc flash detectors to actuate the flaps leading into the arc chute and can include detectors that detect the buildup of corona, or the sudden change in light within the high voltage chamber or the electrical control area.

FIG. 1 also shows partitions between separate chambers. Each partition can include two adjacent walls separated by a hollow area. Likewise, the back and side walls can be similarly configured. The first partition shown in FIG. 1 is in the circuit breaker area shown in FIG. 2. The second partition is located between the flame arresting duct system and the transformer chamber, and in the example shown, another partition is located between the transformer chamber and the high voltage chamber flame arresting duct system. The configuration shown in FIG. 6 shows two flame arresting duct systems 110a and 110b separated by a partition with each of the flame arresting duct systems conveying an internal pressure or flame from the corresponding partitioned electrical section into the flame arresting duct system.

FIG. 7a is an assembly isometric view of an example of a set of ventilation panels and FIG. 7b is a side view of the set of ventilation panels shown in FIG. 7a. The set of ventilation panels can include a entrance vent layer 210 and an exit vent layer 220 with three or more layers sandwiched between the entrance layer 210 and exit layers 220. As shown, a set of ventilation panels can include an inverted vent layer 240 sandwiched between two passage layers 230a and 230b. Additional groups of passage layers and vent layers, can each provide an opposite top or bottom vent passage. A set of ventilation panels 200 can be assembled in one or more of the partitioned pressure relief chambers to add to the flame arresting duct system torturous mechanical maze. As with the adjacent partitioned pressure relief chambers, the set of ventilation panels forces a change in direction increasing the length of time within the pressure relief chamber to consume oxygen to extinguish any internal hot flames within the flame arresting duct system prior to expelling gasses into the external environment.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An arc resistant electrical enclosure comprising:
an enclosure having exterior walls and partitioned electrical sections within the electrical enclosure, each section housing one of an electrical control area, a transformer area and a high voltage area;
one or more independent self-enclosed flame arresting duct systems located within one or more of the partitioned electrical sections, each self-enclosed flame arresting duct system including an arc chute access leading into two or more adjacent partitioned pressure relief chambers; and
an access in each of the adjacent partitioned pressure relief chambers leading into a next one of the two or more adjacent partitioned pressure relief chambers, each next access located in an opposite one of an upper and a lower portion of the partitioned pressure relief chamber forming an enclosed torturous mechanical maze to extinguish internal hot flames within the self-enclosed flame arresting duct system prior to expelling gasses through a flame arresting vent at the end of the flame arresting duct system into an external environment.

2. The enclosure of claim 1 wherein the flame arresting duct system comprises:
an arc chute having the arch chute access into one of the partitioned electrical sections for conveying an internal pressure or flame in the partitioned electrical section into the flame arresting duct system.

3. The enclosure of claim 2 wherein the arc chute further comprises:
an inclined channel for conveying the internal pressure or flame to a different level, the arc chute terminating at an opening into a next adjacent partitioned pressure relief chamber.

4. The enclosure of claim 2 wherein the flame arresting vent comprises:
an exit flap covering the flame arresting vent that opens from a fault pressure in the pressure relief chamber.

5. The enclosure of claim 2 wherein the access in each of the pressure relief chamber partitions comprises:
a flap that opens from a fault pressure in the pressure relief chamber to direct the internal pressure or flames toward a next access flap leading to the next adjacent pressure relief chamber.

6. The enclosure of claim 1 wherein the self-enclosed flame arresting duct system comprises:
an arc chute for conveying an internal pressure or flame from one of the partitioned electrical sections into the flame arresting duct system, the arc chute terminating at a first partition having an opening in a lower portion of the first partition;
an intermediate pressure relief chamber adjacent to the arc chute for directing the internal pressure or flame from the arc chute to a second partition having an second opening in upper portion of the second partition; and
a next pressure relief chamber adjacent to the intermediate pressure relief chamber to direct the internal pressure or flame from the intermediate pressure relief chamber to a next partition having a next opening in an opposite one of the upper and lower portion of the next partition, wherein the pressure or flames are routed through the flame arresting duct system with ninety degree turns from one adjacent pressure relief chamber into the next adjacent pressure relief chamber.

7. The enclosure of claim 1 wherein the access in each of the pressure relief chamber partitions comprises:
a vent.

8. The enclosure of claim 1 wherein the access in each of the pressure relief chamber partitions comprises:
an unrestricted opening.

9. The enclosure of claim 1 wherein the two or more adjacent partitioned pressure relief chambers comprises:
a volume of each next adjacent pressure relief chamber less than a previous adjacent partitioned pressure relief chamber volume.

10. The enclosure of claim 1 further comprising:
one or more arc flash detectors in the one or more partitioned electrical sections to actuate a flaps leading into the flame arresting duct system.

11. The enclosure of claim 1 further comprising:
one or more detectors in the one or more partitioned electrical sections to detect one or more of a buildup of corona or a change in light within the partitioned electrical section.

12. The enclosure of claim 1 wherein the one or more partitioned electrical sections includes:
a partition between adjacent electrical sections.

13. The enclosure of claim 1 wherein the partitioned electrical sections comprises:
two adjacent walls separated by a hollow area.

14. The enclosure of claim 1 further comprising:
a set of ventilation panels located within one or more pressure relief chambers.

15. The enclosure of claim 14 wherein the set of ventilation panels comprises:
a entrance vent layer and an exit vent layer; and
an inverted vent layer sandwiched between two passage layers, each passage layer adjacent to one of the entrance and the exit layers to force a change in direction increasing the length of time within the pressure relief chamber to consume oxygen to extinguish any internal hot flames within the flame arresting duct system prior to expelling gasses into the external environment.

16. The enclosure of claim 1 wherein the electrical control area comprises
one or more control access panels; and
one or more circuit breaker panels each connected with one of the one or more control access panels.

17. The enclosure of claim 16, wherein each of the one or more circuit breaker panels comprises:
a segregated circuit breaker panel area partitioned from each adjacent circuit breaker panel area.

18. A method for relieving internal pressure and extinguishing a flame within an electrical enclosure comprising the step of:
providing an independent fully enclosed flame arresting duct system including an aperture leading into a series of adjacent pressure relief chambers within the electrical enclosure to relieve internal pressure and extinguish the flame, the flame arresting duct system having two or more adjacent partitioned pressure relief chambers;
drawing the internal pressure or internal flame into an arc chute of the flame arresting duct system;
routing the internal pressure or internal flame through a series of the adjacent pressure relief chambers with approximately ninety degree turns between the adjacent pressure relief chambers forming a fully-enclosed torturous mechanical maze to extinguish internal hot flames within the flame arresting duct system; and
expelling the gasses from a last adjacent pressure relief chamber out of the electrical enclosure into the external environment.

19. An independent enclosed flame arresting duct system for an electrical enclosure to relieve internal pressure and extinguish flames within the electrical enclosure, the duct system comprises:
an arc chute having an aperture for conveying an internal pressure or flame from one of a partitioned electrical section within the electrical enclosure into the flame arresting duct system, the arc chute terminating at a first partition having an opening in a lower portion of the first partition;
an intermediate pressure relief chamber adjacent to the arc chute for directing the internal pressure or flame from the arc chute to a second partition having a second opening in an upper portion of the second partition;
a next pressure relief chamber adjacent to the intermediate pressure relief chamber to direct the internal pressure or flame from the intermediate pressure relief chamber to a next partition having opening in an opposite one of the upper and lower portion of the next partition, wherein the pressure and or flames are routed through the duct system with ninety degree turns from one pressure relief chamber into the next adjacent pressure relief chamber; and
a flame arresting vent in a last one of the partitioned pressure relief chambers to release an internal pressure into an external environment.

\* \* \* \* \*